(12) United States Patent
Zhang (10) Patent No.: US 9,063,812 B2
(45) Date of Patent: Jun. 23, 2015

(54) DRIVER INSTALLATION METHOD AND APPARATUS FOR TERMINAL DEVICE

(75) Inventor: Ke Zhang, Shenzhen (CN)

(73) Assignee: ZTE CORPORATION, Shenzhen, Guangdong Province (CN)

(\*) Notice: Subject to any disclaimer, the term of this patent is extended or adjusted under 35 U.S.C. 154(b) by 0 days.

(21) Appl. No.: 14/382,047

(22) PCT Filed: Jun. 12, 2012

(86) PCT No.: PCT/CN2012/076764
§ 371 (c)(1),
(2), (4) Date: Aug. 29, 2014

(87) PCT Pub. No.: WO2013/131332
PCT Pub. Date: Sep. 12, 2013

(65) Prior Publication Data
US 2015/0026674 A1    Jan. 22, 2015

(30) Foreign Application Priority Data

Mar. 6, 2012    (CN) .......................... 2012 1 0055691

(51) Int. Cl.
*G06F 9/445*    (2006.01)
*G06F 9/44*    (2006.01)

(52) U.S. Cl.
CPC ............... *G06F 8/61* (2013.01); *G06F 9/4411* (2013.01)

(58) Field of Classification Search
CPC ............ G06F 8/60; G06F 8/61; G06F 9/4411
USPC .................................................. 717/174–178
See application file for complete search history.

(56) References Cited

U.S. PATENT DOCUMENTS

| | | | |
|---|---|---|---|
| 2004/0019896 A1 | 1/2004 | Yu | |
| 2006/0026280 A1* | 2/2006 | Sadovsky et al. | 709/224 |
| 2007/0260763 A1* | 11/2007 | Kasama | 710/8 |
| 2008/0126963 A1* | 5/2008 | Kim et al. | 715/764 |
| 2009/0024757 A1* | 1/2009 | Proctor | 709/232 |
| 2010/0315682 A1* | 12/2010 | Nakamura et al. | 358/1.15 |

FOREIGN PATENT DOCUMENTS

CN    1527199 A    9/2004
(Continued)

OTHER PUBLICATIONS

Windows Registry—Wikipedia, the free encyclopedia, Feb. 4, 2010, XP055112224. the whole document.
Windows XP: The Complete Guide! Jun. 3, 2007, XP055152959, the whole document.
(Continued)

*Primary Examiner* — Anna Deng
(74) *Attorney, Agent, or Firm* — Ling Wu; Stephen Yang; Ling and Yang Intellectual Property (57) ABSTRACT

A method and apparatus for installing a driver of a terminal device are provided. The method includes: calling a driver installation program, and setting the driver installation program to directly search for a driver program in a local machine; and searching for the driver program in the local machine through the driver installation program, and installing the searched-out driver program. The method and apparatus can improve the speed of a system for installing a driver of a terminal device, thereby improving user experience.

8 Claims, 3 Drawing Sheets

(56) References Cited

FOREIGN PATENT DOCUMENTS

| | | |
|---|---|---|
| CN | 1920774 A | 2/2007 |
| EP | 0802486 A1 | 10/1997 |
| EP | 1508854 A2 | 2/2005 |

OTHER PUBLICATIONS

Disable Windows Update Device Driver Search Prompt in Windows 7/ Vista, Dec. 14, 2008, XP055152958, the whole document.
International Search Report for PCT/CN2012/076764 dated Nov. 27, 2012.

* cited by examiner

DRIVER INSTALLATION METHOD AND APPARATUS FOR TERMINAL DEVICE

TECHNICAL FIELD

The patent document relates to the computer field, and in particular, to a method and apparatus for installing a driver of a terminal device.

BACKGROUND OF THE RELATED ART

At present, basically all manufacturers providing the devices will all provide the driver of the device in the terminal device, used for setting the port of the device in the personal computer (abbreviated as PC). During the process of loading the device driver by the system, especially in Vista and Win7 system, the search for the relevant driver is performed from the network side at first, and the process often needs a very long time. If there is no relevant driver found at the network side, the search for the driver and the loading will be performed locally. In this way, it causes that the user, after inserting the terminal device, needs to wait for a long time to load the driver of the device normally and use the terminal device, which reduces the usage experience of user.

That is to say, according to the default setting of the system, the system usually needs to search for the driver from the network at first when loading the driver of the device, and then searches the driver locally. This method causes that it takes a long time during the process of loading the terminal device by the system, and the majority of the terminal devices will provide their own drivers, used for the system to load the terminal device, and it is totally unnecessary to perform the network search, thus wasting a lot of time for searching the driver.

CONTENT OF THE INVENTION

The embodiment of the present invention provides a method and apparatus for installing a driver of a terminal device, to solve the problem that the loading time of the terminal device is too long, caused by needing to search for the driver of the terminal device required to be loaded at the network side firstly in the related art.

The embodiment of the present invention provides a method for installing a driver of a terminal device, comprising:

calling a driver installation program, and setting the driver installation program to directly search for a driver program in a local machine; and searching for the driver program in the local machine through the driver installation program, and installing a searched-out driver program.

Preferably, the step of setting the driver installation program to directly searching for a driver program in a local machine comprises:

opening a driver query sub-key in a registry by using a registry opening function;

obtaining a key value of a first registry searching and matching driver mode and a key value of a second registry searching and matching driver mode in the driver query sub-key through a registry key value obtaining function;

judging whether both the key value of the first registry searching and matching driver mode and the key value of the second registry searching and matching driver mode are equal to 1; if it is judged as yes, then closing the registry by using a registry closing function; if it is judged as no, then setting both the key value of the first registry searching and matching driver mode and the key value of the second registry searching and matching driver mode as 1 by using a registry key value setting function, and then closing the registry by using the registry closing function.

Preferably, the step of obtaining a key value of a first registry searching and matching driver mode and a key value of a second registry searching and matching driver mode in the driver query sub-key through a registry key value obtaining function comprises:

storing a handle of the driver query sub-key in a first variable;

obtaining the handle from the first variable through the registry key value obtaining function, and obtaining the key value of the first registry searching and matching driver mode and the key value of the second registry searching and matching driver mode from the driver query sub-key according to the handle; and storing the key value of the first registry searching and matching driver mode and the key value of the second registry searching and matching driver mode in a second variable and a third variable respectively.

Preferably, the step of judging whether both the key value of the first registry searching and matching driver mode and the key value of the second registry searching and matching driver mode are equal to 1 comprises:

judging whether both key values of the first variable and the second variable are equal to 1.

Preferably, the step of setting both the key value of the first registry searching and matching driver mode and the key value of the second registry searching and matching driver mode as 1 by using a registry key value setting function comprises:

calling the first variable to set both the key values in the second variable and the third variable as 1 by using the registry key value setting function.

The embodiment of the present invention further provides an apparatus for installing a driver of a terminal device, comprising:

a calling module, configured to call a driver installation program;

a setting module, configured to set the driver installation program to directly search for a driver program in a local machine;

a searching module, configured to search for the driver program in the local machine through the driver installation program, and an installing module, configured to install a searched-out driver program.

Preferably, the setting module is configured to:

open a driver query sub-key in a registry by using a registry opening function;

obtain a key value of a first registry searching and matching driver mode and a key value of a second registry searching and matching driver mode in the driver query sub-key through a registry key value obtaining function;

judge whether both the key value of the first registry searching and matching driver mode and the key value of the second registry searching and matching driver mode are equal to 1; if it is judged as yes, then close the registry by using a registry closing function; if it is judged as no, then set both the key value of the first registry searching and matching driver mode and the key value of the second registry searching and matching driver mode as 1 by using a registry key value setting function, and then close the registry by using the registry closing function.

Preferably, the setting module is configured to obtain the key value of the first registry searching and matching driver mode and the key value of the second registry searching and matching driver mode in the driver query sub-key through the registry key value obtaining function by the following mode:

storing a handle of the driver query sub-key in a first variable;

obtaining the handle from the first variable through the registry key value obtaining function, and obtaining the key value of the first registry searching and matching driver mode and the key value of the second registry searching and matching driver mode from the driver query sub-key according to the handle; and storing the key value of the first registry searching and matching driver mode and the key value of the second registry searching and matching driver mode in a second variable and a third variable respectively.

Preferably, the setting module is configured to judge whether both the key value of the first registry searching and matching driver mode and the key value of the second registry searching and matching driver mode are equal to 1 by the following mode:

judging whether both key values of the first variable and the second variable are equal to 1.

Preferably, the setting module is configured to set both the key value of the first registry searching and matching driver mode and the key value of the second registry searching and matching driver mode as 1 by using a registry key value setting function by the following mode:

calling the first variable to set both the key values in the second variable and the third variable as 1 by using the registry key value setting function.

The beneficial effect of the embodiment of the present invention is as follows: it operates the registry when installing the driver, changing the search mode of the system to search for the driver in the local machine, which solves the problem that the loading time of the terminal device is too long, caused by needing to search for the driver of the terminal device required to be loaded at the network side firstly in the related art, which can improve the speed of installing the driver of the terminal device by the system, thus improving the user experience.

PREFERRED EMBODIMENTS OF THE PRESENT INVENTION

In order to solve the problem that the loading time of the terminal device is too long, caused by needing to search for the driver of the terminal device required to be loaded at the network side firstly in the related art, the embodiment of present invention provides a method and apparatus for installing a driver of a terminal device. The embodiment of the present invention is described in detail with reference to the accompanying drawings hereinafter. It should be illustrated that, in the case of not conflicting, the embodiments in the present application and features in these embodiments can be combined with each other at random.

Figure 1:
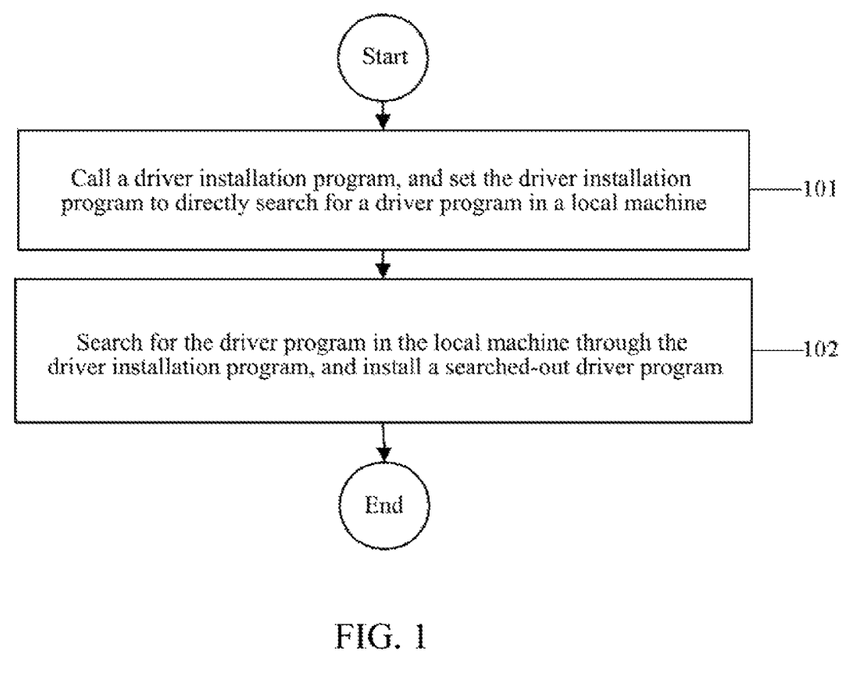
FIG. 1 is a flow chart of a method for installing a driver of a terminal device in accordance with an embodiment of the present invention.

Method Embodiment, according to the embodiment of the present invention, a method for installing a driver of a terminal device is provided. FIG. 1 is a flow chart of a method for installing a driver of a terminal device in accordance with an embodiment of the present invention. As shown in FIG. 1, the method for installing the driver of the terminal device according to the embodiment of the present invention includes the following processing:

in step 101, a driver installation program is called, and the driver installation program is set to directly search for a driver program in a local machine.

Specifically in step 101, setting the driver installation program to directly searching for a driver program in a local machine specifically includes the following processing:

in step 1, a corresponding driver query sub-key in a registry is opened by using a registry opening function (RegOpenKeyEx); the corresponding driver query sub-key is: [HKEY_LOCAL_MACHINE\SOFTWARE\Policies\ Microsoft\windows\DriverSearching] sub-key.

In step 2, a key value of a first registry searching and matching driver mode (DontSearchWindosUpdate) and a key value of a second registry searching and matching driver mode (DontPromptForWindowUpdate) in the sub-key are obtained through a registry key value obtaining function (RegQueryValueEx).

In step 2, it specifically includes the following processing:

1, a handle HKEY of the sub key is stored in a first variable, such as, a key variable.

2, the handle is obtained from the first variable through the registry key value obtaining function, and the key value of the first registry searching and matching driver mode and the key value of the second registry searching and matching driver mode is obtained from the sub-key according to the handle.

3, the key value of the first registry searching and matching driver mode and the key value of the second registry searching and matching driver mode are stored in a second variable (such as, DontSearch variable) and a third variable (such as, DontPrompt variable) respectively.

In step 3, it is judged whether both the key value of the first registry searching and matching driver mode and the key value of the second registry searching and matching driver mode are equal to 1; if it is judged as yes, then the registry is closed by using a registry closing function (RegCloseKey); if it is judged as no, then both the key value of the first registry searching and matching driver mode and the key value of the second registry searching and matching driver mode are set as 1 by using a registry key value setting function (RegSetValueEx), and then the registry is closed by using the registry closing function.

In step 3, judging whether both the key value of the first registry searching and matching driver mode and the key value of the second registry searching and matching driver mode are equal to 1 includes the following processing: judging whether both key values of the second variable (such as, DontSearch variable) and the third variable (such as, DontPrompt variable) are equal to 1.

In step 3, setting both the key value of the first registry searching and matching driver mode and the key value of the second registry searching and matching driver mode as 1 by using a registry key value setting function includes the following processing specifically: calling the first variable (such as, key variable) to set both the key values in the second variable (such as, DontSearch variable) and the third variable (such as, DontPrompt variable) as 1 by using the registry key value setting function.

In step 102, the search for the driver program is performed in the local machine through the driver installation program, and a searched-out driver program is installed.

That is to say, in the practical application, when calling the driver installation program of the device, in the driver installation program code, the driver query sub-key in the registry is opened by using the registry opening function, the values of the first registry searching and matching driver mode and the second registry searching and matching driver mode are obtained through the registry key value obtaining function. If these two key values are not equal to 1, then the registry key value setting function is used to set the key values of the first registry searching and matching driver mode and the second registry searching and matching driver mode as 1, and the registry closing function is used to close it finally. In this way, the system can perform the search in the local machine directly when calling to search for the driver, thus realizing the effect of fast installation.

It can be seen from the above-mentioned processing, the technical scheme of the embodiment of the present invention overcomes the problem that the existing terminal device needs to spend a longer time to perform the search for network driver during the process of loading the driver by the system, and it searches for the driver of the local machine directly. Since each manufacturer provides and loads the driver of the terminal device by itself, after the completion of the program installation, the driver is certainly stored in the local machine, and it is unnecessary for the system to perform the network search. In this way, the user can find the driver quickly and use the device after inserting the device, thus improving the usage experience of user and meeting the requirement on time of the operator at the same time.

Figure 2:
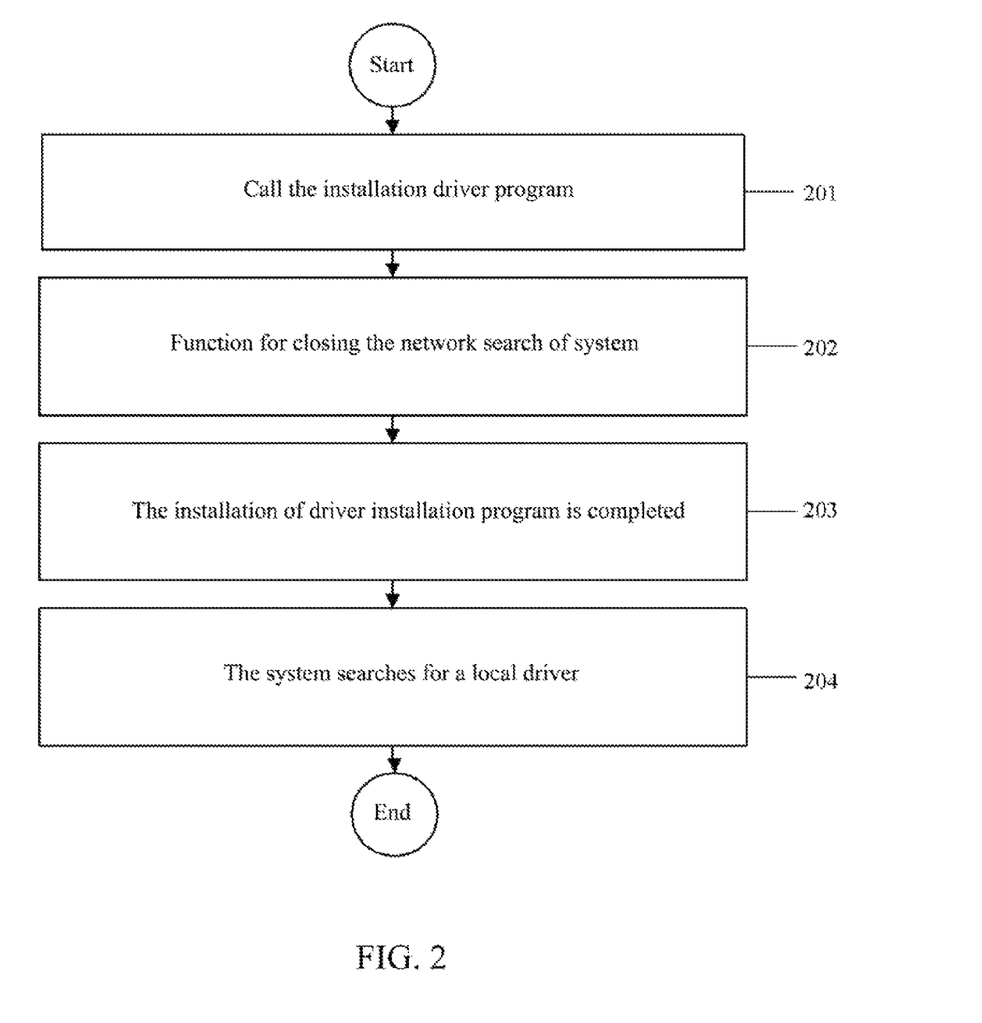
FIG. 2 is a detailed processing flow chart of a method for installing a driver of a terminal device in accordance with an embodiment of the present invention.

FIG. 2 is a detailed processing flow chart of a method for installing a driver of a terminal device in accordance with an embodiment of the present invention. As shown in FIG. 2, it includes the following processing:

in step 201, before the terminal device is used, the system needs to call the corresponding driver program, and installing the driver program needs the system to call the special installation program. The system calls the corresponding driver installation program when using a certain device for the first time.

In step 202, the driver installation program is modified, and the function for closing the network search of system is added in the driver installation program.

In step 203, the installation of driver installation program is completed.

In step 204, the driver installation program only searches for the local driver program and finishes the installation of the driver program when performing the driver installation.

Through modifying the function for the system searching for the network driver, it implements that the system directly searches for the driver locally when loading the driver, which improves the speed of loading the driver greatly.

Figure 3:
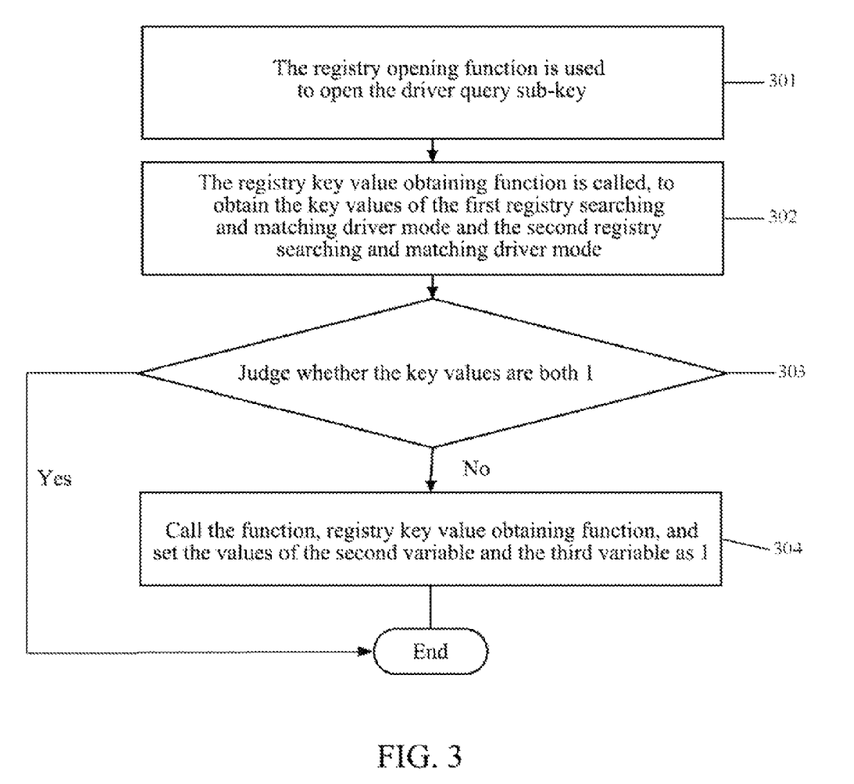
FIG. 3 is a flow chart of adding a function for closing the network search of system in a driver installation program of an embodiment of the present invention.

FIG. 3 is a flow chart of adding a function for closing the network search of system in a driver installation program of an embodiment of the present invention. As shown in FIG. 3, it includes the following processing:

In step 301, when calling the driver installation program, the registry opening function is used to open the driver query sub-key, and the opened handle HKEY is stored in the key variable, for the following operation.

In step 302, the registry key value obtaining function is called, and the key values of the first registry searching and matching driver mode and the second registry searching and matching driver mode are obtained by using the handle stored in the key variable, and stored in the second variable and the third variable respectively.

In step 303, the second variable and the third variable are judged, to determine whether the values of two variables are both 1; if the values of two variables are both 1, then the installation of the driver program is performed; if no, step 304 is executed.

In step 304, the registry key value obtaining setting function is called, and the key variable is used to set the values of the second variable and the third variable as 1, thus achieving the improvement of the speed of loading the driver program by the system.

In sum, in the embodiment of the present invention, through operating the registry when installing the driver, the search mode of the system is changed to search for the driver program in the local machine, which solves the problem that the loading time of the terminal device is too long, caused by needing to search for the driver of the terminal device required to be loaded at the network side firstly in the related art, which can improve the speed of installing the driver of the terminal device by the system, thus improving the user experience.

Figure 4:
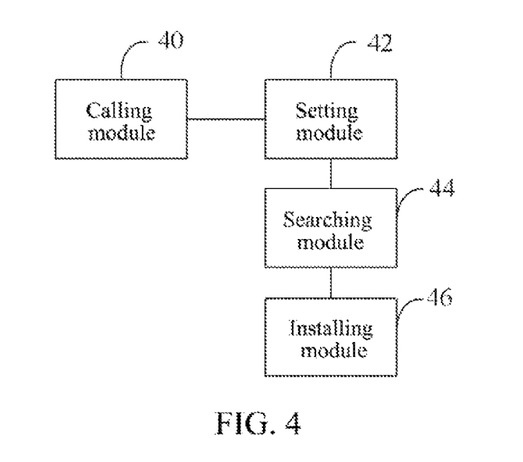
FIG. 4 is a structure diagram of an apparatus for installing a driver of a terminal device in accordance with an embodiment of the present invention.

In apparatus Embodiment,

The embodiment of the present invention provides an apparatus for installing a driver of a terminal device. FIG. 4 is a structure diagram of an apparatus for installing a driver of a terminal device in accordance with an embodiment of the present invention. As shown in FIG. 4, the apparatus for installing the driver of the terminal device according to the embodiment of the present invention includes a calling module 40, a setting module 42, a searching module 44 and an installing module 46, and each module of the embodiment of the present invention will be illustrated in details hereinafter.

The calling module 46 is configured to call a driver installation program.

The setting module 42 is configured to set the driver installation program to directly search for a driver program in a local machine.

The setting module 42 specifically includes a sub-key opening module, a key value obtaining module and a registry processing module; wherein, the sub-key opening module opens a corresponding driver query sub-key in the registry by using a registry opening function (RegOpenKeyEx); the driver query sub-key is [HKEY_LOCAL_MACHINE\SOFTWARE\Policies\Microsoft\windows\DriverSearching] sub-key; the key value obtaining module obtains a key value of a first registry searching and matching driver mode and a key value of a second registry searching and matching driver mode in the sub-key through a registry key value obtaining function; the registry processing module judges whether both the key value of the first registry searching and matching driver mode and the key value of the second registry searching and matching driver mode are equal to 1; if it is judged as yes, then the registry is closed by using a registry closing function; if it is judged as no, then both the key value of the first registry searching and matching driver mode and the key value of the second registry searching and matching driver mode are set as 1 by using a registry key value setting function, and then the registry is closed by using the registry closing function.

Preferably, the key value obtaining module can store the handle HKEY of the sub-key in the first variable, such as a key variable; it can obtain the registry key value obtaining function through the registry key value and obtain the handle from the first variable through the registry key value obtaining function, and obtain the key value of the first registry searching and matching driver mode and the key value of the second registry searching and matching driver mode from the sub-key according to the handle; and it can store the key value of the first registry searching and matching driver mode and the key value of the second registry searching and matching driver mode in a second variable (such as, DontSearch variable) and a third variable (such as, DontPrompt variable) respectively.

When judging whether both the key value of the first registry searching and matching driver mode and the key value of the second registry searching and matching driver mode are equal to 1, the registry processing module can judge whether both key values in the first second variable (such as, DontSearch variable) and the third variable (such as, DontPrompt variable) are equal to 1. And when setting both the key value of the first registry searching and matching driver mode and the key value of the second registry searching and matching driver mode as 1 by using a registry key value setting function, the setting module 42 can call the first variable (such as key variable) to set both the key values in the second variable (such as DontSearch variable) and the third variable (such as, DontPrompt variable) as 1 by using the registry key value setting function.

The searching module 44 is configured to search for the driver program in the local machine through the driver installation program.

The installing module 46 is configured to install a searched-out driver program.

That is to say, in the practical application, when the calling module 40 calls the driver installation program of the device, in the driver installation program code, the setting module 42 opens the driver query sub-key in the registry by using the registry opening function, and obtains the values of the first registry searching and matching driver mode and the second registry searching and matching driver mode through the registry key value obtaining function. If these two key values are not equal to 1, then the registry key value obtaining setting function is used to set the two key values of the first registry searching and matching driver mode and the second registry searching and matching driver mode as 1, and the registry closing function is used to close it finally. In this way, the searching module 44 can perform the search in the local machine directly, thus realizing the effect of fast installation.

It can be seen from the above-mentioned processing, the technical scheme of the embodiment of the present invention overcomes the problem that the existing terminal device needs to spend a longer time to perform the search for network driver during the process of loading the driver by the system, and it searches for the driver of the local machine directly. Since each manufacturer provides and loads the driver of the terminal device by itself, after the completion of the program installation, the driver is certainly stored in the local machine, and it is unnecessary for the system to perform the network search. In this way, the user can find the driver quickly and use the device after inserting the device, thus improving the usage experience of user and meeting the requirement on time of the operator at the same time.

The method for installing the driver is performed by the terminal device using the above-mentioned apparatus for installing the driver, including the following processing:

in step 501, before the terminal device is used, the system needs to call the corresponding driver, and installing the driver program is required to call the special installation program. The calling module 40 calls the corresponding driver installation program when using a certain device for the first time.

In step 502, the setting module 42 modifies the driver installation program, and adds the function for closing the network search of system in the driver installation program.

In step 503, the installation of driver installation program is completed.

In step 504, the searching module 44 only searches for the local driver program when the driver installation program performs the driver installation, and the installing module 46 finishes the installation of the driver program.

Through modifying the function for the system searching for the network driver, it implements that the system directly searches for the driver locally when loading the driver, which improves the speed of loading the driver greatly.

Adding a function for closing the network search of system in a driver installation program by using the above-mentioned apparatus for installing the driver includes the following processing:

In step 601, when the calling module 40 drives the installation program, the setting module 42 opens the driver query sub-key by using the registry opening function, and stores the opened handle HKEY in the key variable, for the following operation.

In step 602, the setting module 42 calls the function, registry key value obtaining function, and obtains the key values of the first registry searching and matching driver mode and the second registry searching and matching driver mode by using the handle stored in the key variable, and stores them in the second variable and the third variable respectively.

In step 603, the setting module 42 judges the second variable and the third variable, to determine whether the values of two variables are both 1; if the values of two variables are both 1, then the installation of the driver program is performed; if no, step 604 is executed.

In step 604, the setting module 42 calls the registry key value obtaining setting function, and uses the key variable to set the values of the second variable and the third variable as 1, thus achieving the improvement of the speed of loading the driver program by the system.

In sum, in the embodiment of the present invention, through operating the registry when installing the driver, the search mode of the system is changed to search for the driver program in the local machine, which solves the problem that the loading time of the terminal device is too long, caused by needing to search for the driver of the terminal device required to be loaded at the network side firstly in the related art, which can improve the speed of installing the driver of the terminal device by the system, thus improving the user experience.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The patent document is not limit to any specific form of the combination of the hardware and software.

The patent document can have a variety of other embodiments. Those skilled in the art can make the corresponding modifications and variations according to the patent document without departing from the spirit and essence of the patent document. And all of these modifications or the variations should be embodied in the protection scope of the appended claims of the patent document.

INDUSTRIAL APPLICABILITY

In the above-mentioned embodiment, the registry is operated when installing the driver, the search mode of the system is changed to search for the driver program in the local machine, which solves the problem that the loading time of the terminal device is too long, caused by needing to search for the driver of the terminal device required to be loaded at the network side firstly in the related art, which can improve the speed of installing the driver of the terminal device by the system, thus improving the user experience.

What we claim is:

1. A method for installing a driver of a terminal device, comprising:
    calling a driver installation program;
    setting the driver installation program to directly search for a driver program in a local machine, wherein setting the driver installation program to directly search for a driver program in a local machine comprises:
        opening a driver query sub-key in a registry by using a registry opening function;
        obtaining a key value of a first registry searching and matching driver mode and a key value of a second registry searching and matching driver mode in the driver query sub-key through a registry key value obtaining function; and
        judging whether both the key value of the first registry searching and matching driver mode and the key value of the second registry searching and matching driver mode are equal to 1, if yes, then closing the registry by using a registry closing function, if no, then setting both the key value of the first registry searching and matching driver mode and the key value of the second registry searching and matching driver mode as 1 by using a registry key value setting function, and then closing the registry by using the registry closing function;
    searching for the driver program in the local machine through the driver installation program; and
    installing a searched-out driver program.

2. The method according to claim 1, wherein, the step of obtaining a key value of a first registry searching and matching driver mode and a key value of a second registry searching and matching driver mode in the driver query sub-key through a registry key value obtaining function comprises:
    storing a handle of the driver query sub-key in a first variable;
    obtaining the handle from the first variable through the registry key value obtaining function, and obtaining the key value of the first registry searching and matching driver mode and the key value of the second registry searching and matching driver mode from the driver query sub-key according to the handle; and
    storing the key value of the first registry searching and matching driver mode and the key value of the second registry searching and matching driver mode in a second variable and a third variable respectively.

3. The method according to claim 2, wherein, the step of judging whether both the key value of the first registry searching and matching driver mode and the key value of the second registry searching and matching driver mode are equal to 1 comprises:
    judging whether both key values of the second variable and the third variable are equal to 1.

4. The method according to claim 3, wherein, the step of setting both the key value of the first registry searching and matching driver mode and the key value of the second registry searching and matching driver mode as 1 by using a registry key value setting function comprises:
    calling the first variable to set both the key values in the second variable and the third variable as 1 by using the registry key value setting function.

5. An apparatus includes at least one processor to install a driver of a terminal device, the apparatus comprising:
    a calling module, configured to call a driver installation program;
    a setting module, configured to set the driver installation program to directly search for a driver program in a local machine, wherein the setting module is configured to:
        open a driver query sub-key in a registry by using a registry opening function;
        obtain a key value of a first registry searching and matching driver mode and a key value of a second registry searching and matching driver mode in the driver query sub-key through a registry key value obtaining function; and
        judge whether both the key value of the first registry searching and matching driver mode and the key value of the second registry searching and matching driver mode are equal to 1, if yes, then close the registry by using a registry closing function, if no, then set both the key value of the first registry searching and matching driver mode and the key value of the second registry searching and matching driver mode as 1 by using a registry key value setting function, and then close the registry by using the registry closing function;
    a searching module, configured to search for the driver program in the local machine through the driver installation program; and
    an installing module, configured to install a searched-out driver program.

6. The apparatus according to claim 5, wherein, the setting module is configured to obtain the key value of the first registry searching and matching driver mode and the key value of the second registry searching and matching driver mode in the driver query sub-key through the registry key value obtaining function by a following mode:
    storing a handle of the driver query sub-key in a first variable;
    obtaining the handle from the first variable through the registry key value obtaining function, and obtaining the key value of the first registry searching and matching driver mode and the key value of the second registry searching and matching driver mode from the driver query sub-key according to the handle; and
    storing the key value of the first registry searching and matching driver mode and the key value of the second registry searching and matching driver mode in a second variable and a third variable respectively.

7. The apparatus according to claim 6, wherein, the setting module is configured to judge whether both the key value of the first registry searching and matching driver mode and the key value of the second registry searching and matching driver mode are equal to 1 by a following mode:
    judging whether both key values of the second variable and the third variable are equal to 1.

8. The apparatus according to claim 7, wherein, the setting module is configured to set both the key value of the first registry searching and matching driver mode and the key value of the second registry searching and matching driver mode as 1 by using the registry key value setting function by a following mode:

calling the first variable to set both the key values in the second variable and the third variable as 1 by using the registry key value setting function.

* * * * *